May 18, 1948.  L. R. CHASE ET AL  2,441,562
CONTINUOUS READING THERMOCOUPLE TEMPERATURE
MEASURING DEVICE FOR ROTARY VESSELS
Filed Nov. 25, 1944
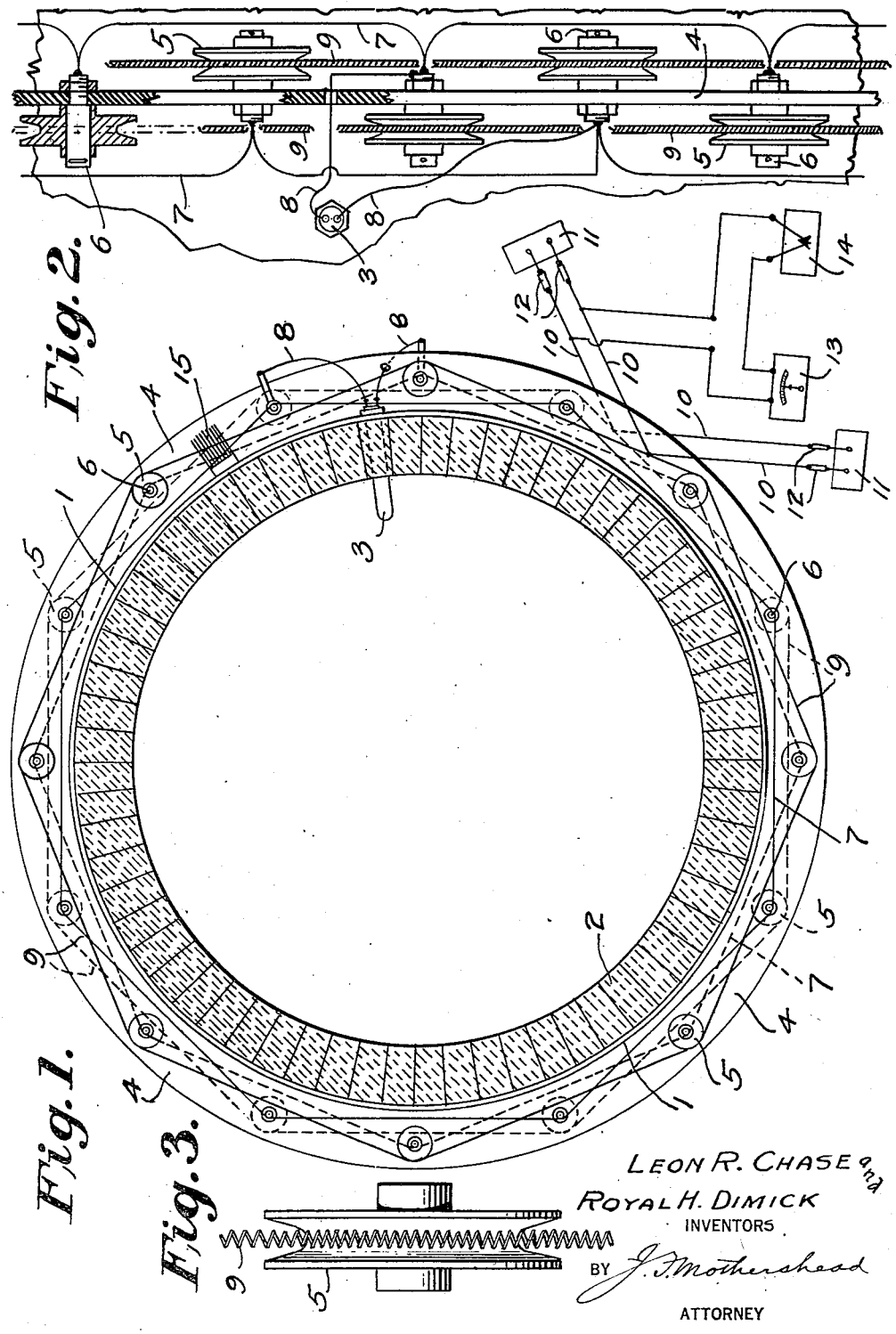
LEON R. CHASE
ROYAL H. DIMICK
INVENTORS
BY
ATTORNEY Patented May 18, 1948

2,441,562

UNITED STATES PATENT OFFICE 2,441,562

CONTINUOUS READING THERMOCOUPLE TEMPERATURE MEASURING DEVICE FOR ROTARY VESSELS

Leon R. Chase, Boulder City, and Royal H. Dimick, North Las Vegas, Nev.

Application November 25, 1944, Serial No. 565,174

3 Claims. (Cl. 73—351)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to continuously indicating devices for temperature measurements, and more particularly to such devices adapted to continuously indicate the internal temperatures prevailing in rotary vessels.

Heretofore, it has been difficult accurately to determine the prevailing internal temperatures in rotary vessels, since optical pyrometers are subject to various errors and bimetallic thermocouples, generating only a very small electromotive force, could not successfully be employed while rotary vessels were in motion. The difficulty in employing a bimetallic thermocouple was that ordinary sliding electrical contacts possessed such variations in electrical resistance as seriously to affect the temperature reading obtained. In the case of internally fired rotary kilns employed in relatively corrosive atmospheres, such as for example, atmospheres containing sulfur gases ordinary sliding electric contacts were practically worthless.

This invention accordingly has for an object the provision of a continuously indicating device for measuring the internal temperatures prevalent in a rotary vessel. A more specific object is the provision of a novel means, combination and arrangement of parts which permits a relatively small electromotive force generated by a movable thermoelectric element to be accurately and continuously conveyed to a stationary indicating instrument. Other objects and advantages of the invention will be apparent or will appear as the ensuing description proceeds.

This invention therefore comprises the measurement of the internal temperature by stationary means exterior the rotary vessel associated with thermoelectric means within the vessel. This is accomplished by a rotary vessel which is provided with a bimetallic thermocouple device extending into a heated rotary vessel, a series of electric contacting devices is carried by said vessel about its circumference and electrically connected to each other, a second series of electrical contacting devices is also carried by said vessel about its circumference, and the members of this second series are also electrically connected to each other; each series of contacting devices is connected respectively to each element of the thermocouple device, a pair of flexible electrical conductors is embraceably mounted about said vessel and engages respectively each series of contacting devices, means are provided for anchoring said flexible conductors against rotary motion and means are provided for withdrawing electrical current from said flexible conductors and conveying the same to an indicating device.

Referring to the drawings,

Fig. 1 is a view, partly in section and partly schematic, of a rotary vessel provided with the continuous contacting means of this invention.

Fig. 2 is a detail showing, partly in section and partly broken away, of the continuous contacting means of this invention.

Fig. 3 is a detail view on an enlarged scale of a suitable flexible conductor and a suitable contacting device.

For a practical embodiment of our invention, and referring now to the drawings, there is shown a rotary vessel 1 provided with a refractory lining 2 and a thermocouple device 3 extending into said vessel through the refractory lining 2. A suitable bimetallic element not shown is a Chromel-alumel bimetallic thermoelectric generator.

Embraceably mounted about said rotary vessel 1 and extending outwardly therefrom is a flange or web 4 which is preferably made of "Transite" or other suitable heat resisting, electrically-insulating material. The web 4 is adapted to rotate with said vessel 1. A plurality of electrically conducting contacting devices, shown as pulleys 5 are mounted on said web 4 by studs 6 whose axes are substantially parallel to the axis of the rotary vessel 1. The pulleys 5 are alternately spaced on opposite sides of the web 4 to form two series of electrical contacting devices. All of the pulleys 5 on the same side of the web 4 are electrically connected to each other by suitable conducting means, shown as wires 7 connecting alternate studs 6. All of the pulleys on the same side of the web 4 are connected to one terminal of the thermoelectric element 3 by suitable conducting means shown as bronze wires 8. Thus, the electromotive force generated in the thermocouple 3 is carried respectively by the conductors 8 to two series of pulleys 5 to form an extended series of moving electrical contacts. Engaging each series of pulleys 5 is a pair of flexible electrical conductors 9 shown as two helical coils of bronze wire extending continuously about the rotary vessel 1 and of a tension sufficient to make firm electrical contact with each series of pulleys 5. The two flexible electrical conductors 9 are yieldingly restrained against rotary movement with said vessel 1 and web 4 by suitable anchoring means, shown as guy wires 10 connected to the flexible conductors 9 and to dead men 11 through insulators 12. The guy wires 10 are preferably anchored by the dead men 11 approximately tangential to the rotary vessel 1 to oppose rotation of the flexible conductors 9 regardless of the direction of rotation. Guy wires 10 also serve as electrical leads connecting the flexible conductors 9 to an indicating instrument 13 which may be a galvanometer of the recording or other type. A cold junction 14 is shown connected in series with the indicating device 13 but it may be at any suitable position in the termocouple electric circuit. Preferably, the cold junction 14 is located at some distance from the rotary vessel, in order that it be maintained at a relatively constant temperature.

In operation, the thermocouple device 3 generates an electromotive force which is proportional to the temperature existing in the rotary vessel 1. The generated electromotive force is conducted by the conductors 7 and 8 from the thermocouple device to the two series of circumferentially spaced pulleys 5. From the pulleys, the electromotive force is transmitted by a combination of rotating and sliding contact to the flexible conductors 9 and thence through the guy wires 10 to the cold junction 14 and indicating device 13. Through the excellence of the electrical contact secured by a plurality of contacting devices, the variations in resistance which might individually be obtained, are smoothed out and a constant low resistance for the entire device is secured, whereby the instrument is calibrated accordingly.

To provide a better contact between the flexible conductors 9 and pulleys 5, suitable means for scraping the flexible conductors 9 is provided, shown as a small wire brush 15 positioned on said vessel 1 and web 4 to engage flexible conductors 9 and maintain them in a clean condition.

Although there has been illustrated and described only one thermocouple device and one web with attendant devices, it is obvious that any number of thermocouples can be mounted in a rotary vessel in accordance with the present invention. Again, although a flexible helical spring of bronze or other electrically conducting material is shown, any other flexible, conducting electrical material can be employed to engage the contacting elements. Likewise, although pulleys have been shown as suitable electrical contacting elements, other means to provide a plurality of contacting surfaces can be provided for insuring an extended electrically conducting surface wherein the average resistance becomes constantly low.

Many other changes will be apparent to one skilled in the art and therefore, various changes can be made without departing from the spirit and scope of the invention.

What is claimed is:

1. In a thermocouple device for measuring the temperature in a rotary vessel, the combination therewith of a bimetallic thermocouple device extending into such a vessel, an annular web embraceably mounted coaxially with said vessel extending outwardly therefrom and adapted to rotate therewith, a plurality of electrically-conducting pulleys mounted on said web to revolve about axes substantially parallel to said vessel axis, said pulleys being alternately disposed on opposite sides of said web about said vessel and electrically insulated from the latter, all of the pulleys on the same side of said web being electrically connected to each other to form a series, means for electrically connecting each series of pulleys respectively with a terminal of the thermocouple device, a pair of resilient, flexible, electrical conductors embracing said pair of conducting pulley series in electrical contact therewith, resilient means for anchoring said resilient conductors against rotation with said pulleys, and an electrical circuit including a cold junction and an indicating device connected in series across said pair of resilient conductors, whereby a continuous indication of the temperature in said rotary vessel is obtained.

2. In a continuously indicating device for measuring internal temperatures of a rotary vessel, the combination therewith of an electrothermal device extending into said vessel for generating an electromotive force proportional to said internal temperature, a series of electrical contacting devices carried by said vessel about its circumference, said contacting device being electricaly insulated therefrom and electrically connected to each other and to said electrothermal device, a second series of electrical contacting devices also carried by said vessel about its circumference but electrically insulated therefrom and electricaly connected to each other and to said electrothermal device, a pair of flexible electrical conductors about said vessel engaging respectively each series of contacting devices, means for anchoring said pair of flexible conductors against rotary motion with said vessel and means cooperating with said anchoring means for indicating continuously the electromotive force generated by said electrothermal device.

3. A device for measuring the internal temperature of a rotary vessel comprising the combination with a rotary vessel of a thermocouple element extending into the vessel, a plurality of rotatable electrical contacting devices mounted exteriorly of the vessel and electrically connected in series to each other and to one side of the thermocouple element, another plurality of rotatable electrical contacting devices mounted exteriorly of the vessel and electrically connected in series to each other and to the other side of the thermocouple element, stationary resilient electrical conductors engaged by the rotatable electrical contacting devices, and an indicating device electrically connected to the stationary resilient conductors to indicate the temperature within the rotary vessel.

LEON R. CHASE.
ROYAL H. DIMICK.

REFERENCES CITED

The following references are of record in the file of this patent:

UNITED STATES PATENTS

| Number | Name | Date |
| --- | --- | --- |
| 1,046,925 | Wilson | Dec. 10, 1912 |
| 1,339,952 | Glaeser | May 11, 1920 |
| 2,303,843 | Knoblauch | Dec. 1, 1942 |

FOREIGN PATENTS

| Number | Country | Date |
| --- | --- | --- |
| 499,016 | Great Britain | Jan. 17, 1939 |